US005841361A

United States Patent [19]

Hoffman

[11] Patent Number: 5,841,361

[45] Date of Patent: Nov. 24, 1998

[54] KEYLESS LOCKING SYSTEM

[76] Inventor: Ronald J. Hoffman, 33165 Cannon Rd., Solon, Ohio 44139

[21] Appl. No.: 616,074

[22] Filed: Mar. 18, 1996

[51] Int. Cl.[6] ............ G06F 7/04; E05B 49/00

[52] U.S. Cl. ............ 340/825.31; 70/278

[58] Field of Search ............ 340/825.31; 70/277, 70/278

[56] References Cited

U.S. PATENT DOCUMENTS

| | | | |
|---|---|---|---|
| 3,098,212 | 7/1963 | Creamer, Jr. | 340/825.69 |
| 4,148,092 | 4/1979 | Martin | 70/278 |
| 4,663,621 | 5/1987 | Field et al. | 340/825.31 |
| 4,812,841 | 3/1989 | Chen | 340/825.31 |
| 4,857,914 | 8/1989 | Thrower | 340/825.31 |
| 4,899,562 | 2/1990 | Gartner et al. | 70/277 |
| 5,021,776 | 6/1991 | Anderson et al. | 340/825.31 |
| 5,057,830 | 10/1991 | Eisermann | 340/825.31 |
| 5,083,122 | 1/1992 | Clark | 340/825.31 |
| 5,252,960 | 10/1993 | Duhame | 340/825.31 |
| 5,475,996 | 12/1995 | Chen | 70/278 |
| 5,604,489 | 2/1997 | Hyatt, Jr. | 340/825.31 |
| 5,609,051 | 3/1997 | Donaldson | 340/825.31 |

*Primary Examiner*—Brian Zimmerman
*Assistant Examiner*—Edward Merz
*Attorney, Agent, or Firm*—D. Peter Hochberg

[57] ABSTRACT

A keyless locking system suitable for use in applications such as locking doors, enabling garage door openers, enabling industrial machine operation, enabling automotive ignition systems and the like. The locking system is comprised of a micro-controller, a keypad, application specific firmware, and operating mechanisms to unlock/enable or lock/disable a particular door, drawer, machine, etc.

19 Claims, 7 Drawing Sheets

KEYLESS LOCKING SYSTEM

FIELD OF THE INVENTION

The present invention relates generally to an electronically controlled locking system. More particularly, the present invention relates to an electronically controlled locking system which does not require the use of a key to provide security and/or the ability to unlock/enable or lock disable a variety of doors, drawers, vaults, door operators, ignition systems, electrical machines and the like.

BACKGROUND OF THE INVENTION

Electronic locking systems, keyless entry systems, and push-button locking systems have been in existence for some time and have been the subject of many patents. Mechanical push-button locks have drawbacks due to cost and their ability to be picked. Prior art electronic locks sometimes offer protection against picking, but generally can be picked by running through combinations quickly with a micro-controller driven combination generator. Accordingly, electronic locks must be connected to a mechanical latch needed to unlock/enable and lock/disable the particular door or device for the security purpose needed. Generally, these systems have required external power sources, and robust mechanical devices to achieve the desired locking/unlocking function. This in turn requires significant cost to produce and install these devices.

The present invention overcomes these and other drawbacks of prior art locking systems, and provides a locking system which is highly effective, convenient to install, easy to operate, and inexpensive to manufacture.

SUMMARY OF THE INVENTION

In accordance with one embodiment of the present invention, there is provided a keyless locking system comprised of a locking means movable between a locked position and an unlocked position, and control means for controlling the locking means. The control means is comprised of input means for selecting an operating state, including a lock combination programming mode for entering a programmed lock combination code having variable length, a locked mode for moving the locking means to the locked position, and an unlocked mode for moving the locking means to the unlocked position. The control means also includes a memory means for storing the programmed lock combination code. The control means stores the programmed lock combination code entered by a user only if the programmed lock combination code has a length that is greater than or equal to a minimum combination code length and less than or equal to a maximum combination code length.

In accordance with another embodiment of the present invention, there is provided a keyless locking system comprised of locking means movable between a locked position and an unlocked position, control means for controlling the locking means, the control means including input means for selecting an operating state of the control means. The operating states include a locked mode and an unlocked mode. The system further comprises a locking mechanism means for moving each locking means to the locked position in the locked mode, and moving the locking means to an unlocked position in the unlocked mode, the locking means being driven by a motor means.

In accordance with another embodiment of the present invention, there is provided a keyless locking system comprised of locking means including a locking member movable between a locked position and an unlocked position, and control means for controlling the locking means, the control means having an input means for selecting an operating state of the control means, including a locked mode and an unlocked mode. The system further comprises locking mechanism means for moving each locking means to the locked position in the locked mode, and moving the locking means to the unlocked position in the unlocked mode. The locking mechanism means comprises resilient connecting means for connecting the locking mechanism means to the locking member, and manual override means for overriding the lock mode to temporarily move the locking means from the locked position to the unlocked position.

In accordance with another embodiment of the present invention, a keyless locking system comprises locking means including a locking member movable between a locked position and an unlocked position, and control means for controlling the locking means. The control means includes input means for selecting an operating state of the control means, including a locked mode and an unlocked mode. The system further comprises locking mechanism means for moving each locking means to the locked position in the locked mode and moving the locking means to the unlocked position in the unlocked mode, and power source means supplying power to the locking mechanism means only when the locking mechanism means moves the locking means to the locked position from the unlocked position or when the locking mechanism means moves the locking means to the unlocked position from the locked position.

In accordance with a preferred embodiment of the present invention, it is an object of the present invention to provide an improved push-button, keyless locking system for unlocking/enabling and locking/disabling various doors, drawers, vaults, door operators, ignition systems, electrical machines and the like.

Another object of the present invention is to provide a keyless locking system having a mechanism which can maintain either an unlocked/enabled state or locked/disabled state without requiring the expenditure of power from a power source (e.g., batteries).

A further object of the present invention is to provide a keyless locking system having a mechanical override lever on the inside or protected side of the lock arrangement to assure exit in any emergency condition. This lever can also maintain a locked condition to prevent entry from the outside.

Another object of the present invention is to provide a keyless locking system having a single button on the inside of the lock arrangement which enables the user to unlock/enable, lock/disable, or place the locking system in a lock combination programming mode.

Another object of the present invention is to provide a keyless locking system which allows the user to program a variable length lock combination between a specified minimum number of combination digits and a specified maximum number of combination digits.

It is still a further object to provide a keyless locking system, wherein a single keypad input will lock/disable the door, vault, etc., if the lock is in the unlocked/enabled state.

Another object of the present invention is to provide a keyless locking system which saves battery life by not issuing a lock/disable command to a lock engagement mechanism if the command is the result of a keypad entry error and the locking system is already in the locked/disabled condition.

Still another object of the present invention is to provide a keyless locking system which measures the battery level each time the locking system changes state, and warn the user, audibly and visually, to change the batteries if voltage of the batteries drops below a specified level.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE PREFERRED EMBODIMENT

It should be appreciated that while the preferred embodiment of the present invention will be described with reference to a keyless locking system for a door with a conventional rotating door knob and door latch assembly, the present invention is also contemplated for use in connection with other items including garage doors, drawers, file cabinets, vaults, ignition systems, electrical machines and the like. Some alternative embodiments are discussed below.

Reference is now made to the drawings wherein the showing is for the purpose of illustrating a preferred embodiment of the invention only, and not for the purpose of limiting same.

Figure 1:
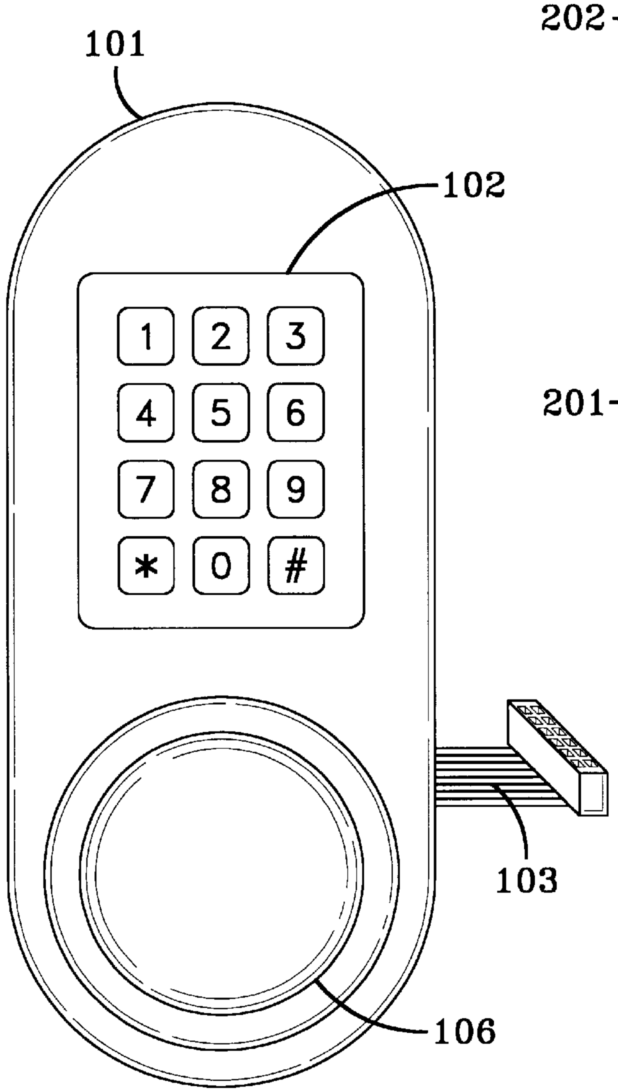
FIG. 1 is a front view of an outside unit of a locking system illustrating a preferred embodiment of the present invention.
Figure 2:
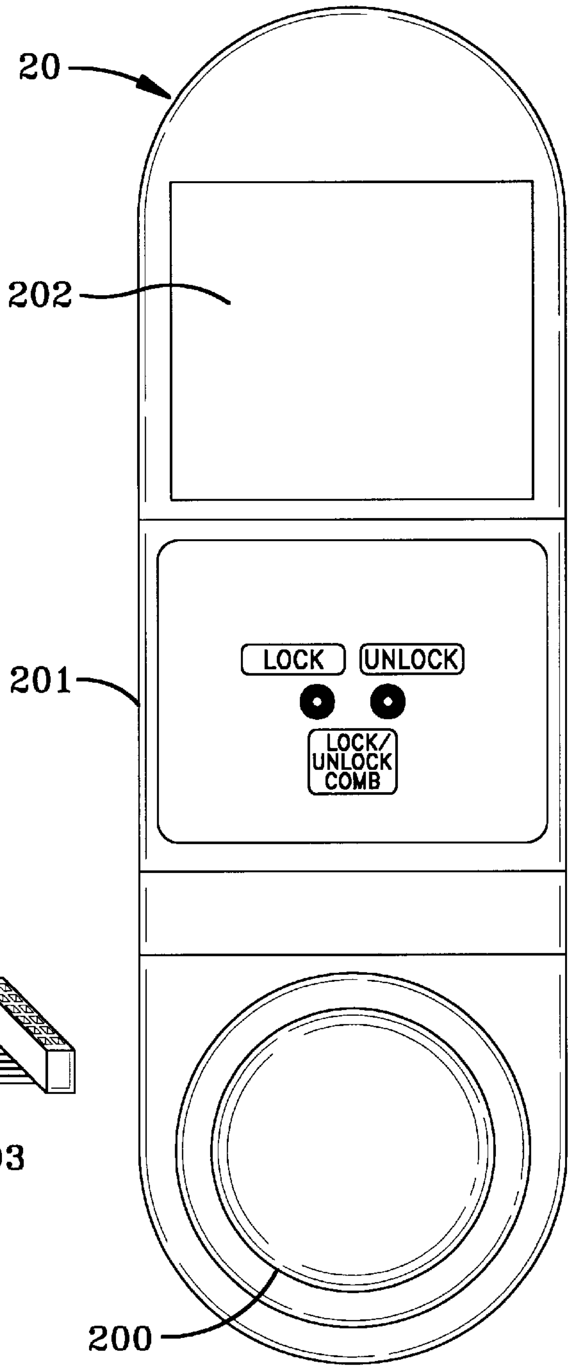
FIG. 2 is a front view of an inside unit of the locking system illustrating a preferred embodiment of the present invention.
Figure 3:
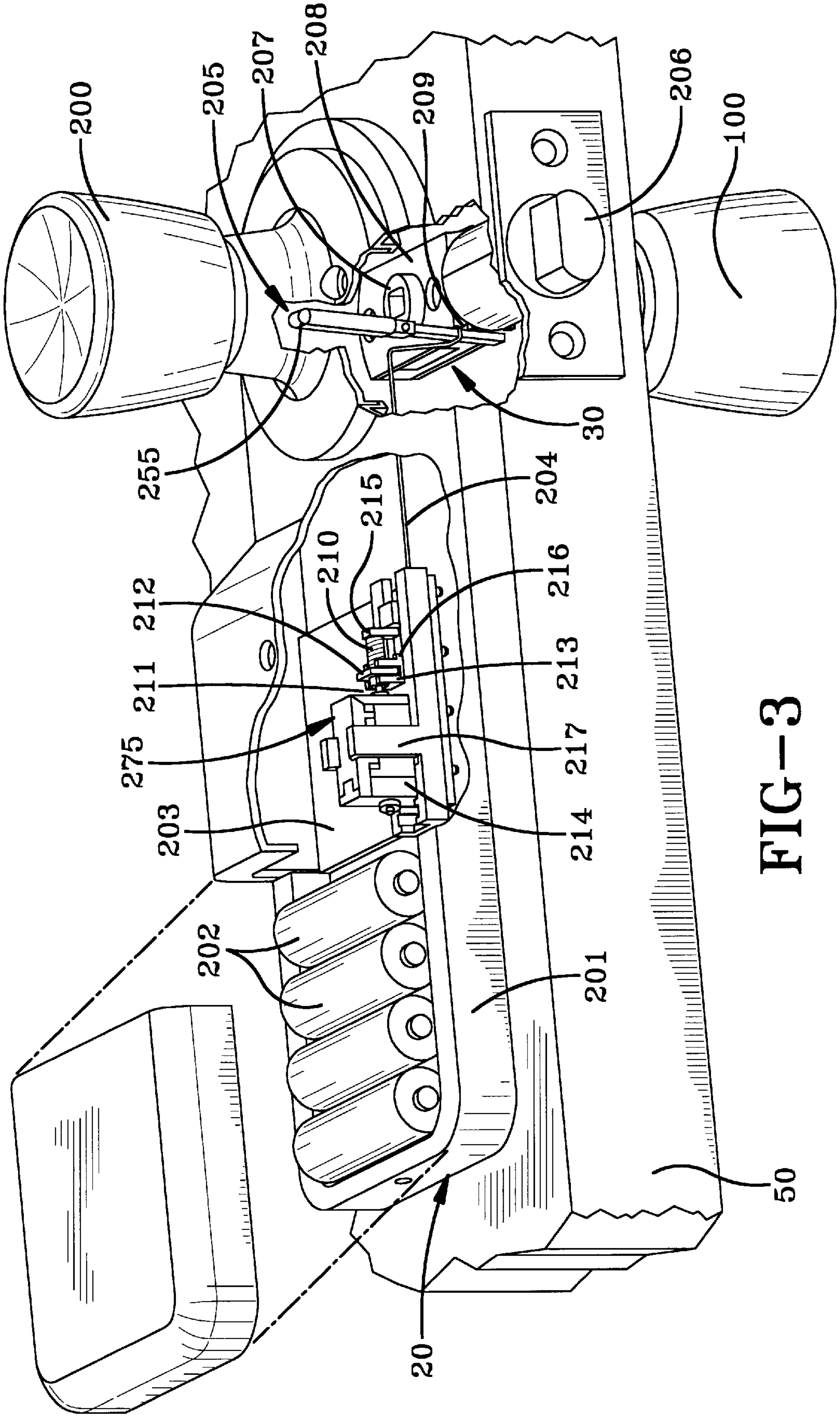
FIG. 3 is a plan view of the inside unit mounted to a door, with a cut away view of a lock control module housing and a door latch assembly.
Figure 4:
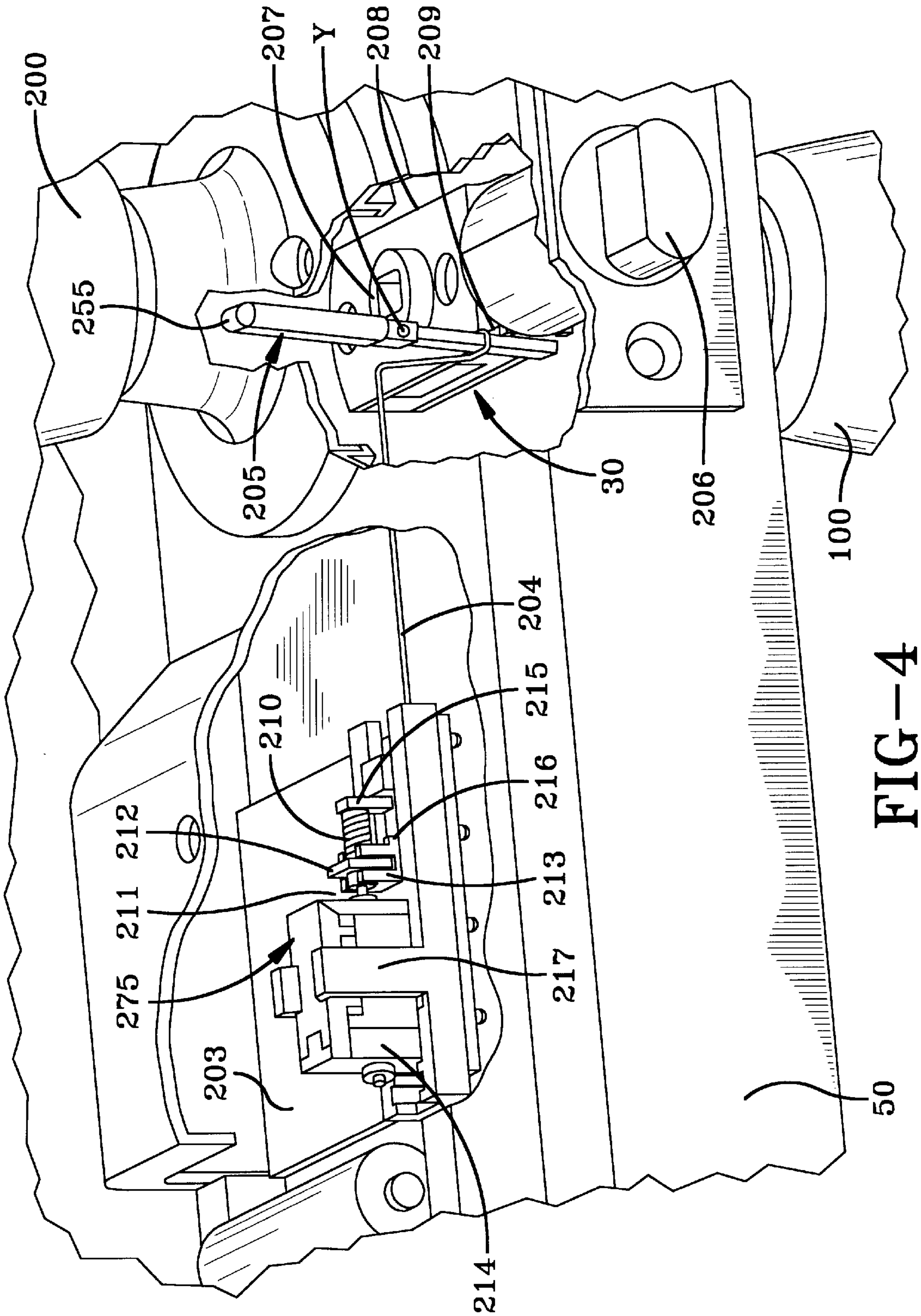
FIG. 4 is an enlarged view of the cut away view of the lock control module housing and door latch assembly shown in FIG. 3.

A preferred embodiment of the present invention has two units which are connected together with a door latch assembly 30 (FIGS. 3 and 4) to form a locking system. The two units are an outside unit 10 (FIG. 1) and an inside unit 20 (FIGS. 2–4). Outside unit 10 is mounted to the outside of door 50 adjacent outside door knob 100, and is generally comprised of a faceplate having a 3×4 matrix keypad 102 and a connecting ribbon cable 103. Ribbon cable 103 is connected to the keypad 102 on the outside unit 10 and passes through the two-inch door knob mechanism hole in door 50 and connects to a lock mechanism control module 203, which is mounted to a circuit board located inside control module housing 201 of inside unit 20.

Inside unit 20 is mounted adjacent to inside door knob 200 on the inside of door 50, and is generally comprised of the above-mentioned control module housing 201 and lock mechanism control module 203, a battery compartment 202, a lock mechanism transmission spring wire 204, and a locking lever 205. Control module housing 201 houses battery compartment 202, lock mechanism control module 203, transmission spring wire 204 and locking lever 205.

Door latch assembly 30 is the same type normally used with a conventional door knob set, except that at least one slot (i.e., a locking lever engagement slot 209) is added to receive locking lever 205. Door latch assembly 30 includes a beveled door latch 206 which mounts in a latch mechanism hole, which passes from the edge of door 50 to the center of a two-inch door knob mechanism hole. The door latch 206 connects to a door knob rotary cam 207 by means of a connecting arm 208.

Locking lever 205 is movable into ("locked") and out of ("unlocked") locking lever engagement slot 209 by pivoting locking lever 205 about an axis Y (FIG. 4). When locking lever 205 is positioned in locking lever slot 209, mechanism connecting arm 208 cannot move. Therefore, neither inside door knob 100 nor outside door knob 200 can be rotated, and door latch 206 cannot be retracted into the latch mechanism hole. This causes door 50 to remain locked and door latch 206 to act as a half-inch deadbolt. When locking lever 205 is removed from locking lever engagement slot 209, both inside door knob 100 and outside door knob 200 can be rotated to retract door latch 206 into the latch mechanism hole, and allow door 50 to be opened.

Lock engagement mechanism 275 is generally comprised of a motor mount slide guide 217, a motor 214, a motor shaft 211, a screw drive shaft 210, a drive screw flag 215, a floating drive plate 212, an actuator slide 213, and a pair of vertical stops 216. Motor mount slide guide 217 locates and retains motor 214 in position, provides captive guides which hold actuator slide 213 relative to motor 214, and mounts all of the components of lock engagement mechanism 275 to the circuit board of lock mechanism control module 203. This arrangement of components simplifies assembly and reduces cost.

Screw drive shaft 210 is attached to motor shaft 211. Screw drive shaft 210 passes through threaded, floating drive plate 212, which is engaged in a slot in actuator slide 213. When motor 214 is actuated, floating drive plate 212 provides the force to move actuator slide 213. Transmission spring wire 204 is connected to the actuator slide 213 and to locking lever 205. When actuator slide 213 moves, transmission spring wire 204 moves locking lever 205 either into or out of locking lever engagement slot 209. It is recognized that providing a bell crank or other types of standard mechanical linkage known in the art would allow lock mechanism control module 203 to be located to the side or below the door knob as required by a particular application.

During the development of the present invention, it was observed that if screw drive shaft 210 drove floating drive plate 212 and actuator slide 213 into stop members located at both ends of travel, floating drive plate 212 would jam on the threads of screw drive shaft 210, thus preventing motor 214 from reversing direction. This caused locking lever 205 to remain fixed in the locked or unlocked position. The force causing the jam was due to the reduced dynamic coefficient of friction, the motor torque and the rotational inertia of the motor armature and screw drive shaft 210. The only force available to un-jam floating drive plate 212 and screw drive shaft 210 was the motor torque. However, it had to overcome a higher static coefficient of friction without the aid of rotational inertia.

To overcome the foregoing problem, rotational drive screw flag 215 is fixed to the end of screw drive shaft 210, and a pair of vertical stops 216 are arranged on actuator slide

213 at opposite sides thereof. Only one of the vertical stops 216 can be seen in FIGS. 3 and 4. Drive screw flag 215 is free to rotate until it catches on one of the vertical stops 216 arranged on actuator slide 213. When drive screw flag 215 engages with one of the vertical stops 216, further rotation of the screw drive shaft 210 is prevented, and consequently, further travel of actuator slide 213 is stopped. Since vertical stops 216 prevent the rotation of screw drive shaft 210 at each end of travel, floating drive plate 212 does not bind on the threads of screw drive shaft 210 when it stopped. The foregoing arrangement eliminates thread binding and jams, and thus allows the motor torque to reverse directions easily to move locking lever 205 between the unlock/enable position and the lock/disable position.

As noted above, floating drive plate 212 is arranged in a slot in actuator slide 213. This arrangement eliminates any binding due to motor shaft axial or center line misalignment or screw drive shaft 210 eccentricity. While other types of shaft couplers could be used to provide this alignment compensation, floating drive plate 212 and slotted actuator slide 213 simplify assembly, reduce drive friction, and reduce the parts count.

It should be appreciated that motor mount slide guide 217, screw drive shaft 210, floating drive plate 212 and actuator slide 213 can be made of plastic. Motor 214 and the plastic components are easily snapped together on the circuit board of lock mechanism control module 203 and enable fast, low cost manufacture of the locking system.

Transmission spring wire 204 is formed in a shape which holds locking lever 205 captive and also connects to actuator slide 213. As best shown in FIG. 4, spring wire 204 forms a loop around locking lever 205. The shape of spring wire 204 allows locking lever 205 to be manually actuated by the user by pushing downward (or pulling upward) on tab 255 of locking lever 205. Because transmission spring wire 204 is made from resilient spring wire, locking lever 205 will return to its original position relative to locking lever slot 209 when tab 255 is released. That is, if locking lever 205 is in the locked position (i.e., in engagement slot 209), and tab 255 of locking lever 205 is manually depressed to pivot locking lever 205 out from slot 209, locking lever 205 will return to a locked position when tab 255 is released. In this regard, after door latch 206 moves outward from latch mechanism hole and returns to its latched position, spring transmission wire 204 urges locking lever 205 back into locking lever engagement slot 209, thus returning the locking system to a locked condition.

Figure 5:
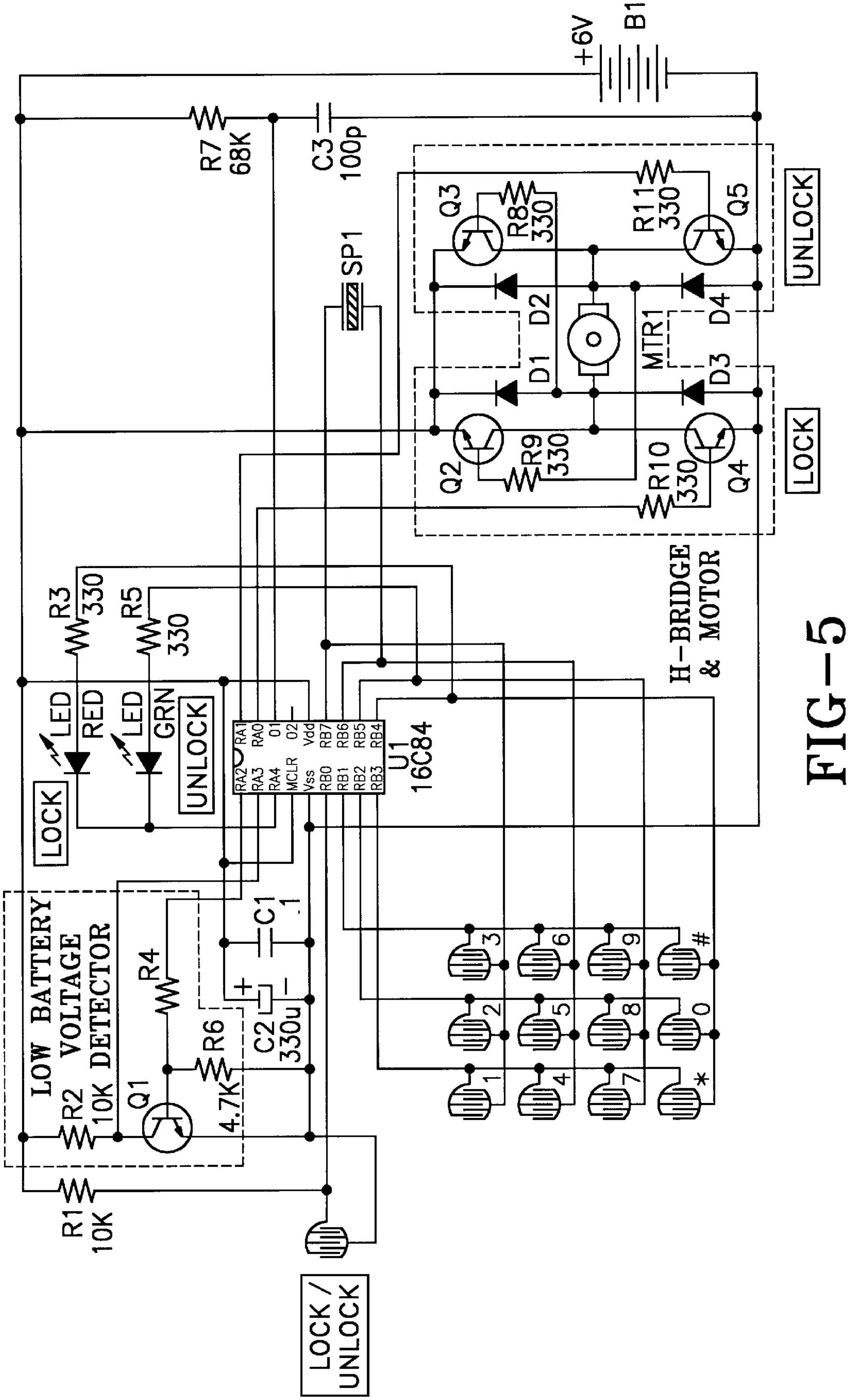
FIG. 5 is an electronic circuit schematic diagram of the locking system.
Figure 6A:
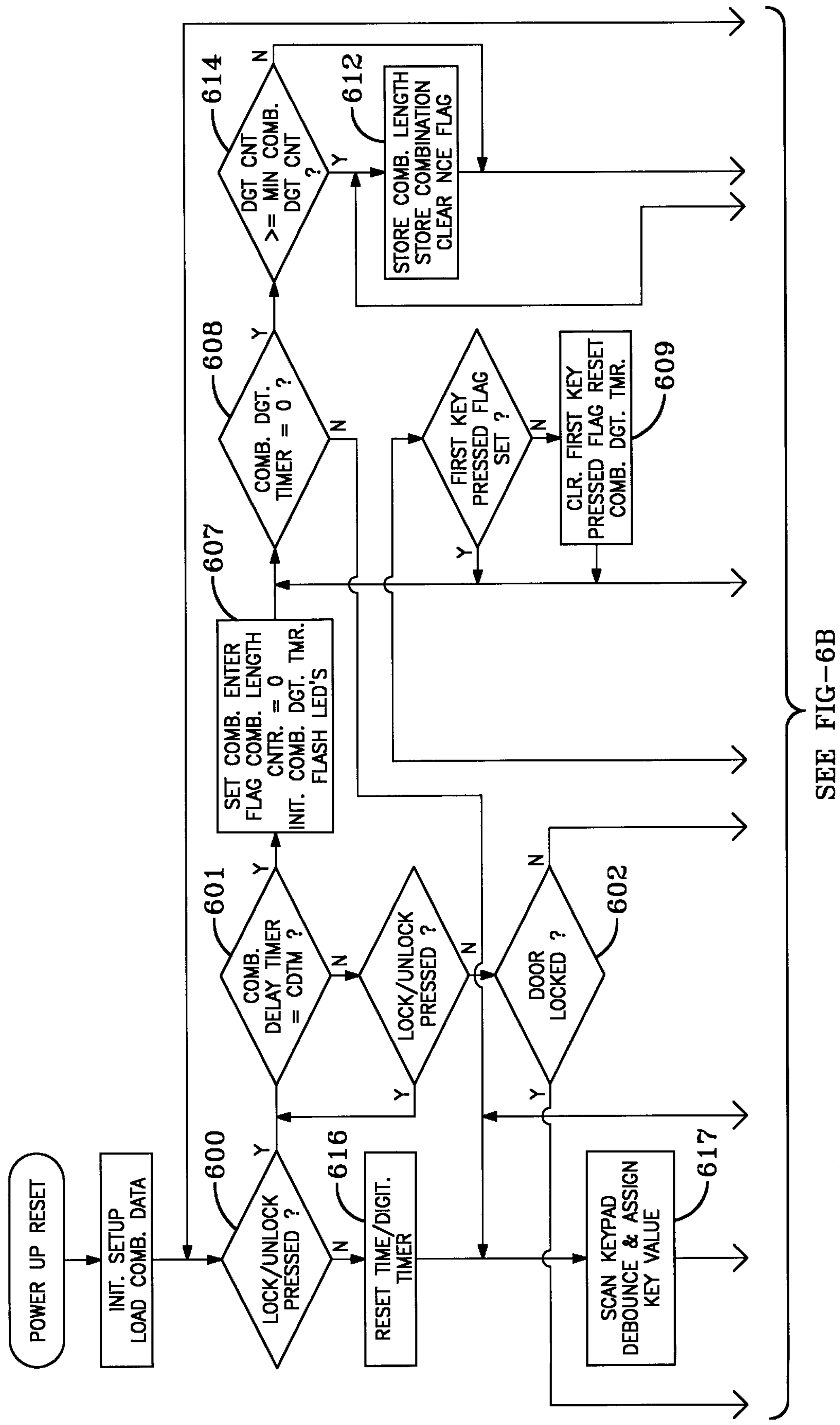
FIG. 6 is a software flow diagram of the locking system.
Figure 6B:
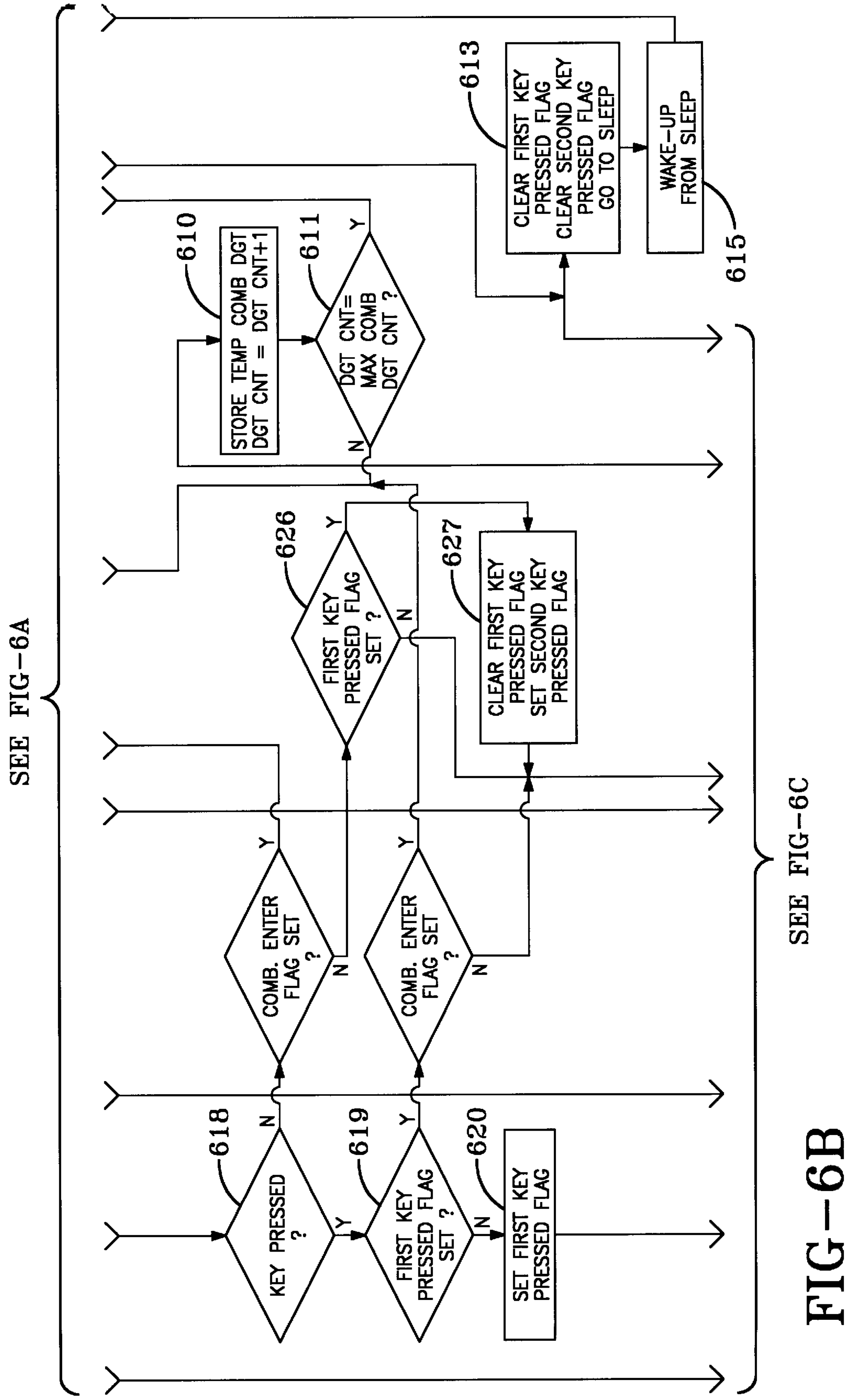
Figure 6C:
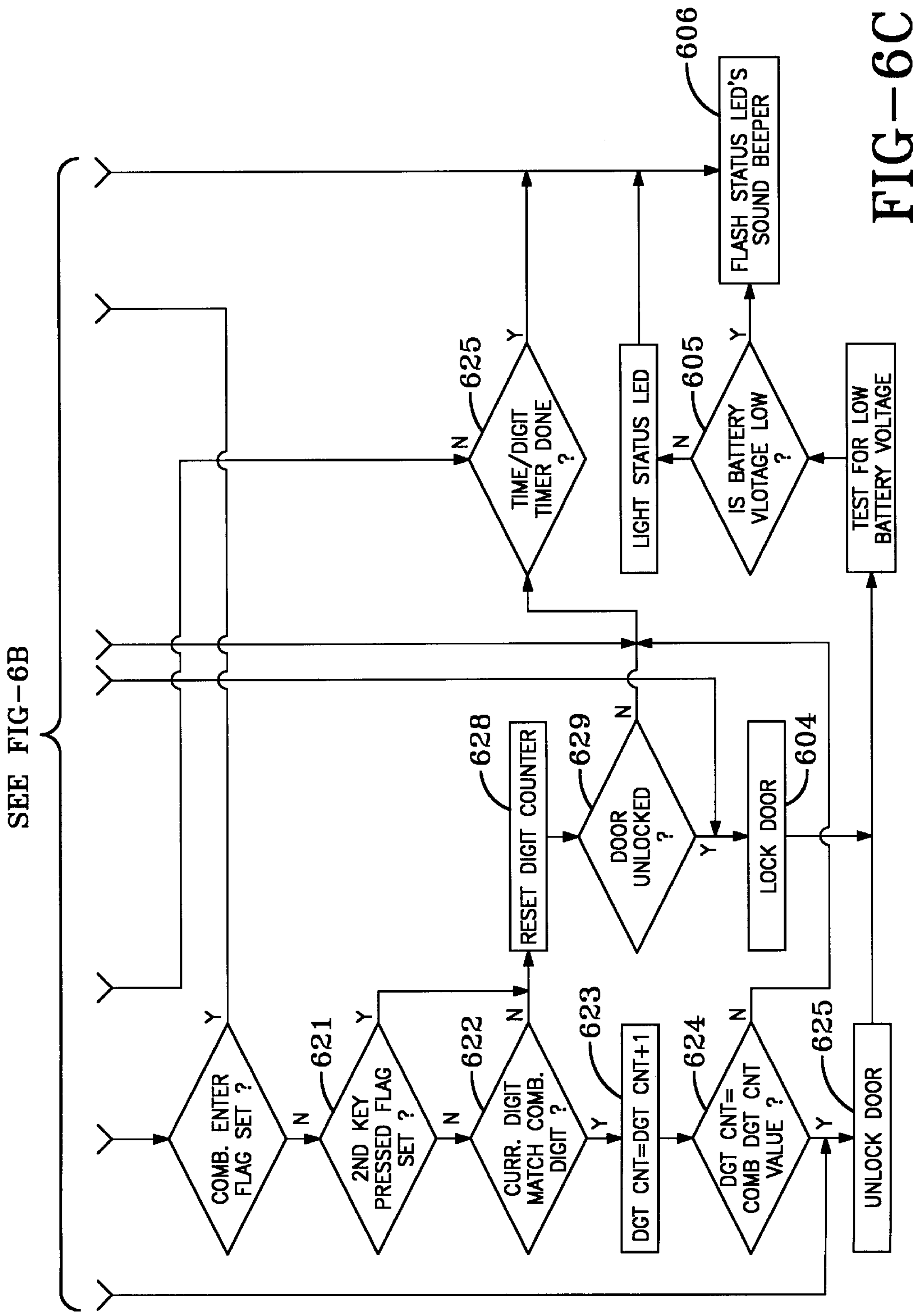

Several features of the present invention result from control firmware programming. The firmware (i.e., software or program code) which controls the locking system operations includes: combination programming, keypad decoding, combination decoding, locking mechanism actuation, annunciators output control, low battery detection, and permanent variable length combination storage. Reference will now be made to FIGS. 5 and 6, which respectively illustrate the electronic hardware and control program logic of the present invention.

FIG. 5 illustrates the electronic hardware of the present invention. A circuit is shown having a single push button switch 300. One end of switch 300 is connected to resistor R1 and microprocessor U1. The other end of R1 is connected to the positive terminal of battery B1 (+6 V). R1 is preferably a 10K resistor. The other end of switch 300 is connected to the negative terminal of battery B1 (Gnd). A resistor R2, preferably 10K, is connected to +6 V on one end and the collector of transistor Q1 and microprocessor U1 on the other end. The emitter of Q1 is connected to Gnd. Resistor R6, preferably a 4.7K resistor, is connected to the base of Q1 on one end and Gnd at the other end. Resistor R4 is connected to the base of Q1 on one end and microprocessor U1 on the other end. Capacitor C1, preferably 330 microfarads and C2, preferably 0.1 farads, are both wired to +6 V on one end and Gnd on the other end. A twelve button keypad 302 with assigned characters 0–9,*, # is connected to microprocessor U1, clock SP1 and resistor R3 and R5, both resistors preferably having a value of 330 ohms. The other ends of resistors R3 and R5 are connected to LD1 and LD2, respectively. Clock SP1 is also connected to microprocessor U1. Resistor R7, preferably a 68K resistor, is connected to +6 V on one end and microprocessor U1 and capacitor C3 on the other end. Capacitor C3 is preferably 100 picofarads and is connected to ground on the other end. Two signals from the microprocessor U1 are connected to a "H" bridge & Motor assembly 304. The "H" bridge and motor assembly 304 consist of transistors Q2, Q3, Q4, Q5, resistors R8, R9, R10, R11, all preferably having a resistance of 330 ohms, diodes D1, D2, D3, D4 and motor MTR1.

The following discussion relates to operation of the LOCK/UNLOCK push-button. To achieve a single push-button control strategy on inside unit 20, control programming was developed to allow the LOCK/UNLOCK push-button to perform different functions depending on how the push-button was pressed. The control programming first decides whether the LOCK/UNLOCK push-button is to be used for changing the position of the locking member from locked to unlocked, or vice versa, or to enter a New Combination Entry (NCE) mode. When the LOCK/UNLOCK push-button is pressed (600), a NCE mode delay timer is initialized. If the LOCK/UNLOCK push-button is released before the NCE mode delay timer times out (601), then the program checks for the current LOCKED or UNLOCKED status (602) and commands the lock engagement mechanism to change to the opposite state (603 or 604). The program lights the correct status LED (LD1 or LD2) and then checks the battery level (605). If the battery level is below a specified value, the program flashes the correct status LED and toggles two outputs to generate an audio warning (606) via a small speaker SP1. Therefore, any momentary press and release of the LOCK/UNLOCK push-button, will reverse the position of the locking member, check the batteries and annunciate the system's and batteries' status.

When the LOCK/UNLOCK push-button is pressed and held until the New Combination Entry (NCE) delay timer times out, the program flashes both of the status LED's, indicating the beginning of the New Combination Enter (NCE) mode (607). After the LED's stop flashing, the program initializes the digit entry timer (608). Each time a new combination digit is entered (i.e., a keypad key is pressed and then released), the digit entry timer is re-initialized (609) and the number of lock combination digits entered is checked. If the number of digits entered is equal to the specified maximum number of lock combination digits (611), the program stores the new programmed lock combination and combination length (612) in permanent EEPROM memory, returns to normal LOCK/UNLOCK mode, resets New Combination Enter mode flag, and goes to sleep (613). If the digit entry timer times out (608) while in the NCE mode, the program checks the number of lock combination digits that have entered (614). If the number of lock combination digits entered is greater than or equal to the specified minimum number of lock combination digits, then the program stores the new programmed lock combination and combination length (612) in permanent EEPROM memory, returns to normal LOCK/UNLOCK mode, resets New Combination Enter mode flag, and goes to sleep (613).

It should be understood that any battery backed-up or permanent rewritable type of memory could be used in place of EEPROM memory for permanently storing the lock combination and combination length. The permanent memory is only accessed when the batteries are changed, or the microprocessor supply voltage goes below a specified operating level. If the digit entry timer times out (608) and the number of combination digits entered is less than the specified minimum number of digits (614), then the combination does not change, the program returns to the LOCK/UNLOCK mode, resets New Combination Enter mode flag, and the microprocessor goes to sleep (613).

The following discussion assumes the locking system is not in the New Combination Entry (NCE) mode, but is operating in the normal LOCK/UNLOCK Keypad (LUK) mode and the microprocessor is asleep. When either the LOCK/UNLOCK push-button is pressed or any keypad key is pressed, an interrupt (615) is generated which wakes up the microprocessor U1 from sleep. The program first checks to see if the LOCK/UNLOCK push-button was pressed (600).

The following discussion examines the program execution and key functions resulting from normal LOCK/UNLOCK keypad (LUK) combination entry. When the program determines that a keypad key is pressed, the program initializes the time/digit entry timer (616). Next, the program scans the keypad (617) to determine which keypad key was pressed. It scans the keypad at least one more time to debounce the key. After the debounce period (i.e., a valid key state is confirmed), the program checks to see if the key is pressed or not pressed (618). The program looks up the assigned key value and assigns it to the current key value (619). If the key is pressed, the program looks at the first key pressed flag to see if it is set. If it is not set, the program sets the first key pressed flag (620), then checks to see if the second key pressed flag is set (621). If the second key pressed flag is not set, the program checks to see if the key pressed matches the lock combination digit pointed to by the combination digit counter (DGT CTR) (622). If they match, the program increments the combination digit counter, i.e., DGT CTR=DGT CTR+1 (623). The program checks to see if the combination digit counter is greater than or equal to the combination length (624). If the combination digit counter (DGT CTR) is greater than or equal to the combination length, then the program UNLOCKS the door (603). It does this by turning on the correct "H" bridge driver transistors (Q2, Q5) for a specified period of time. The motor 214 turns drive screw shaft 210 until rotating drive screw flag 215 makes contact with vertical stop 216 at the latch end of the actuator slide 213. Since the motor run time and the motor drive current is limited by the bridge driver transistors (Q2, Q5), there is no need for end-of-travel limit switches which eliminates parts, simplifies the drive assembly, significantly boosts performance and reliability, and reduces size, assembly time and cost. After UNLOCKING the door (603), the program checks the voltage level of the batteries (605) while loaded by the LOCKED or UNLOCKED indicator LED. If the batteries' voltage is below a specified value, the program flashes either the LOCKED or UNLOCKED indicator LED (depending on current locking system state) and sound an audible annunciator using speaker SP1, while the LED flashes (606). Accordingly, the user is provided with ample warning to replace the batteries before there is any problem with the locking system.

If a wrong lock combination digit is entered, when the current digit is matched to the lock combination digit (622) and the error is detected, the program will reset the combination digit counter (628). Next, the UNLOCKED status check (629) is performed and the program will either rescan the keypad (617), or reset the system flags and go to sleep (613).

If the combination digit counter is less than the combination length (624), the program checks the time/digit timer (625). If the time/digit timer is timed out, the program resets the first key and second key pressed flags and goes to sleep (613). If the time/digit timer is not timed out, the program rescans the keypad (617). If the key is still pressed and the first key pressed flag is set, then the program checks the time/digit timer (625) and either rescans the keypad (617) or resets flags and goes to sleep (613) as previously described. If the key is pressed and then released before the time/digit timer times out, then the first key pressed flag is cleared and the second key pressed flag is set (626, 627). Assuming that the time/digit timer is not yet timed out (625), and the user presses a keypad key again (617), the program will set the first key pressed flag (620) and check to see if the second key pressed flag is set (621), which in this case it is set. The program counts the second key entry before the time/digit timer times out as an error, sets the combination digit counter to zero (628), and checks the locking system status (629). If the locking system is in the UNLOCKED state, the program commands a LOCKED state (604), checks the battery voltage (605) and resets flags and goes to sleep (613) as previously described. If the locking system is already in the LOCKED state, the program just checks the time/digit timer (625) and rescans the keypad (617) or resets flags and goes to sleep (613) as previously described. By not issuing a LOCKED command (604), the batteries are conserved and the output drivers and motor cannot be damaged by a continuously energized, locked rotor condition. This could occur, for example, if someone was just trying various lock combinations to try and "pick" the lock. Without checking for the LOCKED state, each erroneous entry would cause the program to issue a LOCK COMMAND and would in turn, cause the motor or bridge drivers to be ON continuously. This would drain the batteries and cause possible over-heating and failure of motor 214 and "H" bridge drivers (Q3, Q4).

Since the user supplies the force required to rotate door knobs 100, 200 and open door 50, a small, inexpensive, low energy lock engagement mechanism 275 can be used to lock and unlock door latch assembly 30. Lock engagement mechanism 275 is designed to use a very small, standard, permanent magnet motor 214 used in toys and cameras. The motor driven lock engagement mechanism 275, "H" bridge driver and control program work together to actuate (i.e., lock or unlock) door latch assembly 30 without the need for end-of-travel limit switches. This reduces the size and cost of the unit.

It should be appreciated that the locking system is preferably powered by four "AA" batteries which will last for approximately one year in normal service. However, other power sources are also suitable. The locking engagement mechanism can maintain either the unlock/enable state or the lock/disable state for an indefinite period of time, and use no power. The only time significant power is required is when the state of the locking engagement mechanism is changed from the existing state to the opposite state, i.e., from unlocked/enabled to locked/disabled, or from locked/disabled to unlocked/enabled. The rest of the time the microprocessor U1 enters a sleep state which draws minimal amounts of leakage current.

General operation of the locking system will now be described. When the locking system is in the locked/disabled state, locking lever 205 is positioned in locking lever engagement slot 209. When locking lever 205 is engaged in engagement slot 209, door knobs 100 and 200 cannot be rotated and door latch 206 cannot be retracted into the latch mechanism hole, thus door latch 206 provides a half-inch deadbolt to secure door 50. When the locking system is in the unlocked/enabled position, locking lever 205 is removed from engagement slot 209 in door latch assembly 30. Accordingly, door knobs 100 and 200 can be rotated to retract door latch 206 into the latch mechanism hole and open door 50. In this case, door latch 206 acts as a normal spring loaded door latch.

To operate the locking system, the user momentarily presses the lock/unlock push-button on inside unit 20. This action causes the locking system to change lock conditions, from either locked to unlocked or from unlocked to locked, depending on the lock condition when the lock/unlock push-button is pressed. When the lock condition of the locking system is changed, an LED (red for LOCKED or green for UNLOCKED) is lighted for a brief time to indicate the current lock condition of the locking system.

To exit from a space protected by the locking system, the user briefly presses the lock/unlock push-button. Assuming the locking system was in the locked condition, the locking system changes to the unlocked condition and the green LED lights indicating the UNLOCKED state. The user then may simply turn the inside door knob 200, open door 50, and step outside. Once outside, the user closes door 50 and presses any key on the keypad 102, except for the first digit of the lock combination code. This procedure locks door 50 and prevents door knob 100 from being rotated. As noted above, locking lever 205 also has a manual override tab 255 to allow the user to manually unlock door 50 and guarantee exit during an emergency.

To enter the protected space, the user enters the lock combination code on keypad 102. When the lock combination code has been successfully entered, the locking system will change to the UNLOCKED condition. The user may then rotate outside door knob 100, open door 50, and enter the protected space. Once inside, the user closes door 50 and momentarily presses the LOCK/UNLOCK push-button on inside unit 200, which locks door 50 and illuminates the red LED briefly to indicate the locked condition of the locking system. The user may verify the locked condition by attempting to rotate inside door knob 200, which will not rotate.

To program a new lock combination code, the user first unlocks door 50 and opens it. Second, the user presses and holds the LOCK/UNLOCK push-button for several seconds until one or more LED's begin to flash. When the flashing stops, this indicates that the locking system is in the NEW COMBINATION ENTRY MODE. Accordingly, the user may now program a new lock combination code using keypad 102. The lock combination code may be of variable length between a specified minimum and maximum number of digits. If the lock combination code reaches the maximum number of digits, the entered lock combination code and maximum length is stored immediately in permanent memory. If the number of combination digits entered is greater than or equal to the minimum number of digits required, and a specified time period has elapsed after the last digit was entered, the lock combination code and length will be stored in permanent memory. If the number of combination digits entered is less than the minimum number of digits required and a specified time period has elapsed, the locking system will revert to the NORMAL MODE, and the partially entered new lock combination code will be ignored. In this case, the previously programmed lock combination code will still unlock the door. This will prevent the possibility of small children from accidentally changing the lock combination code.

Each time the locking system changes modes or states, the microprocessor checks the battery level to determine if the batteries need replacing. If the battery voltage level goes below a predetermined level under a known load, the LED indicating the locking system's current state flashes and an audible beep is heard during each LED flash. The battery threshold level is chosen so that the locking system can be operated at least a minimum number of times after the initial alarm is given. This provides the user with an adequate time window to replace the batteries. Under normal operating conditions, the batteries will last about one to two years, depending upon the number of lock/unlock cycles performed each day.

By combining the right mechanical mechanisms: floating drive plate 212; rotational screw drive flag 215; vertical stops 216 on the actuator slide 213; single piece motor mount slide guide 217; transmission spring wire 204; locking lever 205; latch mechanism engagement slot 209; with control programming which allows: (a) single push-button operation for inside LOCK/UNLOCK/COMBINATION ENTRY modes, (b) variable lock combination length entry, (c) low battery voltage detection and alarm, (d) time and current limiting to motor drive, and (e) sequential time-based LOCK/UNLOCK combination entry; a very low cost, easily installed, highly reliable locking system can be achieved. The combined features work together to create a system which is very user friendly from both a cost and user aspect.

Other keyless locking system applications are easily accomplished by changing the circuit and the lock engagement mechanism to interface with other devices. For example, to interface with a garage door opener, the output "H" bridge driver and motor are replaced with a relay. The control program is modified slightly to issue a momentary relay closure when the combination has been entered correctly. When the relay contacts close momentarily, the garage door opener inputs are closed and the door opener reverses its state, open to closed, or closed to open. Another application example would be for controlling any machine, ignition system, or electrical device so that only the owner or authorized person could run, drive or operate, respectively the device protected by the keyless locking system. To accomplish this, the output bridge amplifier and motor are again replaced by a relay. This application, however, requires that the control program causes the relay contacts to close when the correct lock combination is entered. The program would keep the relay contacts closed until either a lock combination entry error is entered, or an "OFF" input is received.

Other applications would use the same "H" bridge and lock engagement mechanism, but would use different mechanical linkage to lock vaults, filing cabinets, safety deposit boxes, and other types of products. Clearly, the technology could be scaled to different types of applications involving sliding doors, automatic door openers and the like.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

The invention claimed is:

1. A keyless locking system for operation by a user, said system comprising:

locking means movable between a locked position and an unlocked position; and control means for controlling said locking means, said control means comprising:

means for selecting one of a plurality of operating states of said control means, said operating states including a lock combination programming mode for entering a programmed lock combination code having variable length, a locked mode for moving said locking means to the locked position, and an unlocked mode for moving said locking means to the unlocked position, said selecting means having an idle state and an active state wherein putting said selecting means temporarily in said active state and returning to said idle state causes said control means to enter said lock mode if said locking means is in said unlocked position, and causes said control means to enter said unlocked mode if said locking means is in said locked position, and putting said select means into said active state for a specified period of time causes said control means to enter said program mode, and memory means for storing the programmed lock combination code and the programmed lock combination code length, said control means storing the programmed lock combination code and the programmed lock combination code length in said memory means only if the programmed lock combination code has a length that is greater than or equal to a minimum combination code length and less than or equal to a maximum combination code length.

2. A keyless locking system according to claim 1, wherein said control means exits said lock combination programming mode after a predetermined period of time has elapsed without entry of a combination code digit.

3. A keyless locking system according to claim 1, wherein said control means moves said locking means from the locked position to the unlocked position, when a lock combination code entered by a user matches said programmed lock combination length and said programmed lock combination code stored in said memory means.

4. A keyless locking system according to claim 1, wherein said control means further comprises a display means for indicating when said control means has entered said lock combination programming mode.

5. A keyless locking system according to claim 4, wherein said display means comprises at least one LED.

6. A keyless locking system according to claim 1, wherein said selecting means comprises a single push-button switch for selecting between said lock combination programming mode, said locked condition mode, and said unlocked condition mode, wherein depressing and releasing said switch causes said locking means to enter said locked condition if in said unlocked condition, and causes said locking means to enter said unlocked condition if in said locked condition, and depressing said switch for a specified period of time before releasing causes said operating system to enter said lock combination programming mode.

7. A keyless locking system comprising:

locking means movable between a locked position and an unlocked position;

control means for controlling said locking means, said control means including input means for selecting one of a plurality of operating states of said control means, said operating states including a locked mode and an unlocked mode;

locking mechanism means for moving the locking means to the locked position in said locked mode and moving said locking means to the unlocked position in the unlocked mode; and motor means for driving said locking mechanism means, said motor means comprised of:

a motor having a threaded shaft;

plate means threadingly engaged with said threaded shaft;

stop engaging means attached to the end of said threaded shaft;

slide means with end-of-travel vertical stop means connected to said locking mechanism means and engaged with said plate means, wherein said threaded shaft rotates in response to the actuation of said motor means to move said plate means and said slide means along the length of said threaded shaft, said stop engaging means contacting said vertical stop means to limit the length of travel of said slide means, said locking mechanism means moving in response to the movement of said slide means to move said locking means from one of the locked position and the unlocked position to the other of the unlocked position and the locked position.

8. A keyless locking system according to claim 7, wherein said stop engagement means is a rotational flag affixed to the end of said threaded shaft.

9. A keyless locking system according to claim 7, wherein said vertical stop means comprises a first and a second stop member arranged on each end of said slide means.

10. A keyless locking system according to claim 7, wherein said locking mechanism means comprises:

a resilient spring wire for connecting said locking mechanism means to said locking member.

11. A keyless locking system according to claim 10, and further comprising manual override means for overriding said lock mode to temporarily move said locking means from the locked position to the unlocked position, said manual override means includes a pivotable locking member, said locking member connected to said resilient spring wire.

12. A keyless locking system comprising:

locking means movable between a locked position and an unlocked position; and control means for controlling the movement of said locking means, said control means including:

input means for selecting one of a number of operating states of said control means, said operating states including a lock mode, an unlock mode and a program mode, said input means having an idle state and an active state wherein putting said input means temporarily in said active state and returning to said idle state causes said control means to enter said lock mode if said locking means is in said unlocked position, and causes said control means to enter said unlocked mode if said locking means is in said locked position, and putting said input means into said active state for a specified period of time causes said control means to enter said program mode.

13. A keyless locking system according to claim 12, and further comprising:

locking mechanism means for moving the locking means to the locked position in said locked mode and moving said locking means to the unlocked position in the unlocked mode; and power source means for supplying power to said locking mechanism means only when said locking mechanism means moves the locking means from the locked position to the unlocked position or when the locking mechanism means moves the locking means from the unlocked position to the locked position.

14. A keyless locking system according to claim 12, wherein said program mode includes entering a programmed lock combination code having variable length, and memory means for storing the programmed lock combination code and the programmed lock combination code length, said control means storing the programmed lock combination code and the programmed lock combination code length in said memory means only if the programmed lock combination code has a length that is greater than or equal to a predetermined minimum combination code length, and said control means storing the programmed lock combination code and the programmed lock combination code length in said memory means up to a predetermined maximum combination code length regardless of the number of combination code digits entered during said program mode.

15. A keyless locking system according to claim 12, wherein said control means exits said lock combination programming mode after a predetermined period of time has elapsed without entry of a combination code digit.

16. A keyless locking system according to claim 14, wherein said control means moves said locking means from the locked position to the unlocked position, when a lock combination code entered by a user matches said programmed lock combination length and said programmed lock combination code stored in said memory means.

17. A keyless locking system according to claim 12, wherein said control means further comprises a display means for indicating when said control means has entered said lock combination programming mode.

18. A keyless locking system according to claim 17, wherein said display means comprises at least one LED.

19. A keyless locking system according to claim 12, wherein said input means comprises a single push-button switch for selecting between said lock combination programming mode, said locked condition mode, and said unlocked condition mode, wherein depressing and releasing said switch causes said locking means to enter said locked condition if in said unlocked condition, and causes said locking means to enter said unlocked condition if in said locked condition, and depressing said switch for a specified period of time before releasing causes said control means to enter said lock combination programming mode.

* * * * *